June 4, 1935. M. SCHNAIER 2,003,516
ART OF MANUFACTURING AND PACKAGING ARTICLES
Filed May 20, 1930 6 Sheets-Sheet 1

INVENTOR
Milton Schnaier
BY
Dean, Fairbank, Hirsch & Foster
ATTORNEYS

June 4, 1935. M. SCHNAIER 2,003,516
ART OF MANUFACTURING AND PACKAGING ARTICLES
Filed May 20, 1930 6 Sheets-Sheet 2
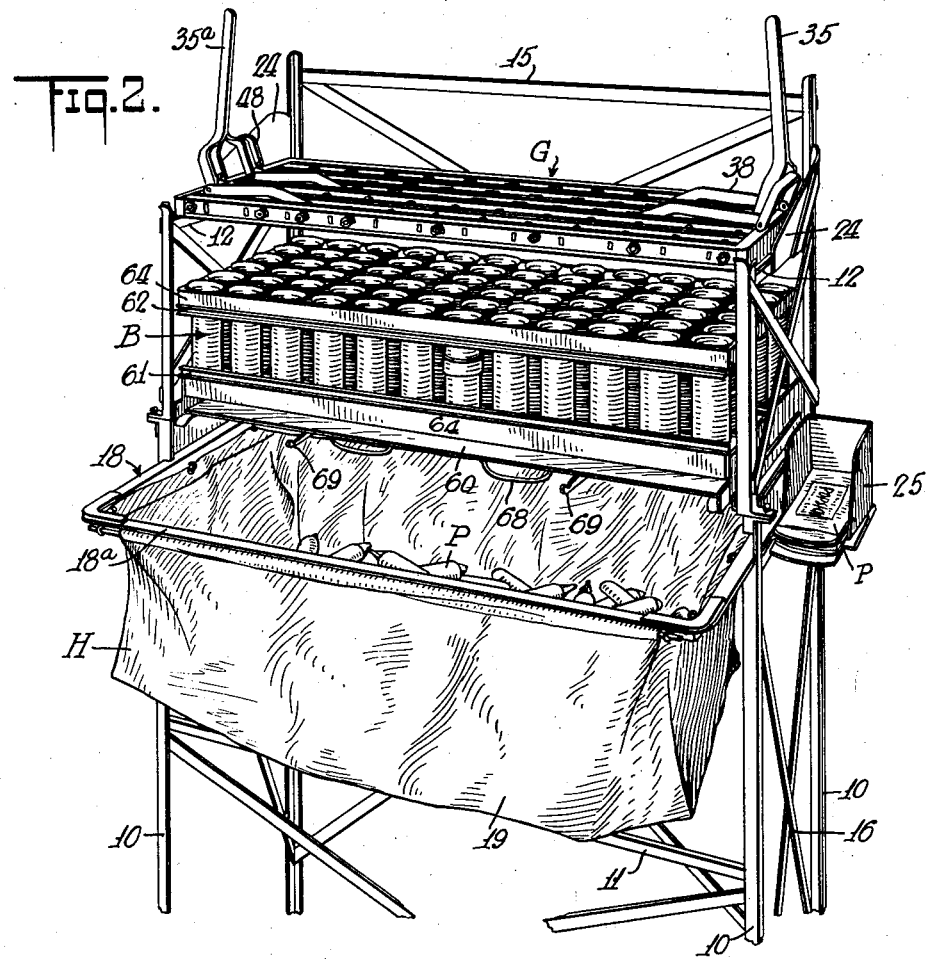
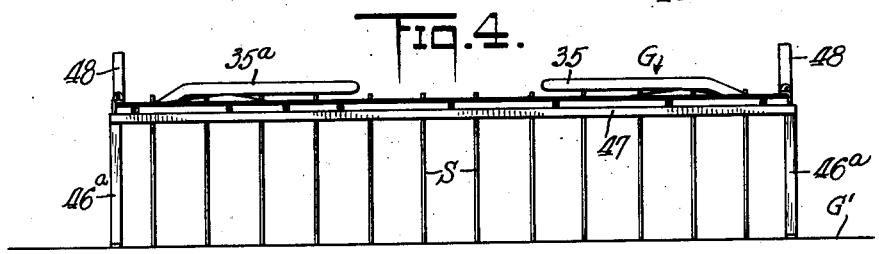
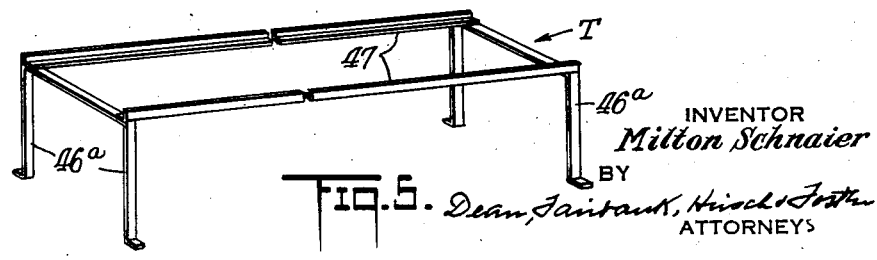
INVENTOR
Milton Schnaier
BY
Dean, Fairbank, Hirsch & Foster
ATTORNEYS

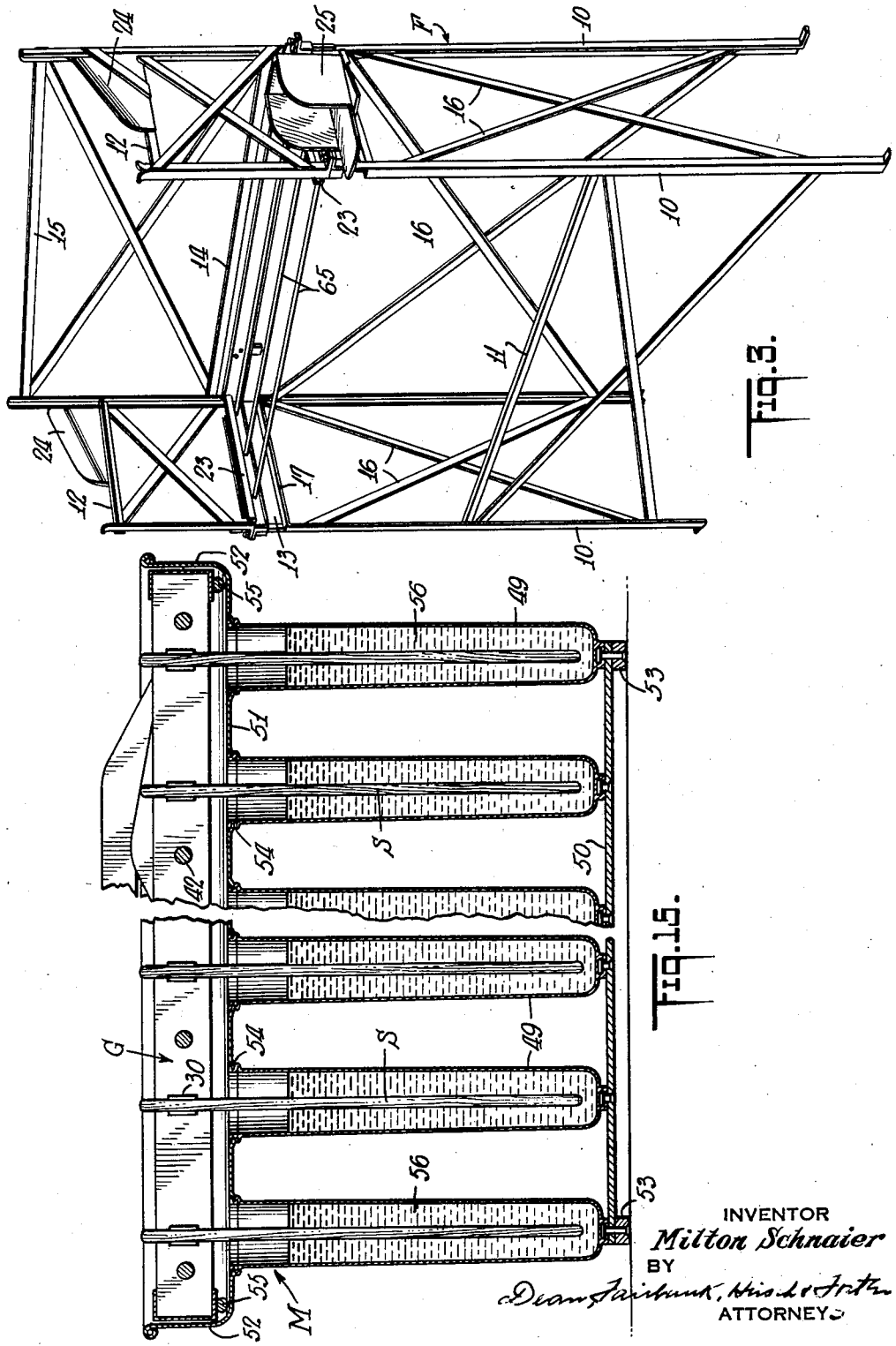

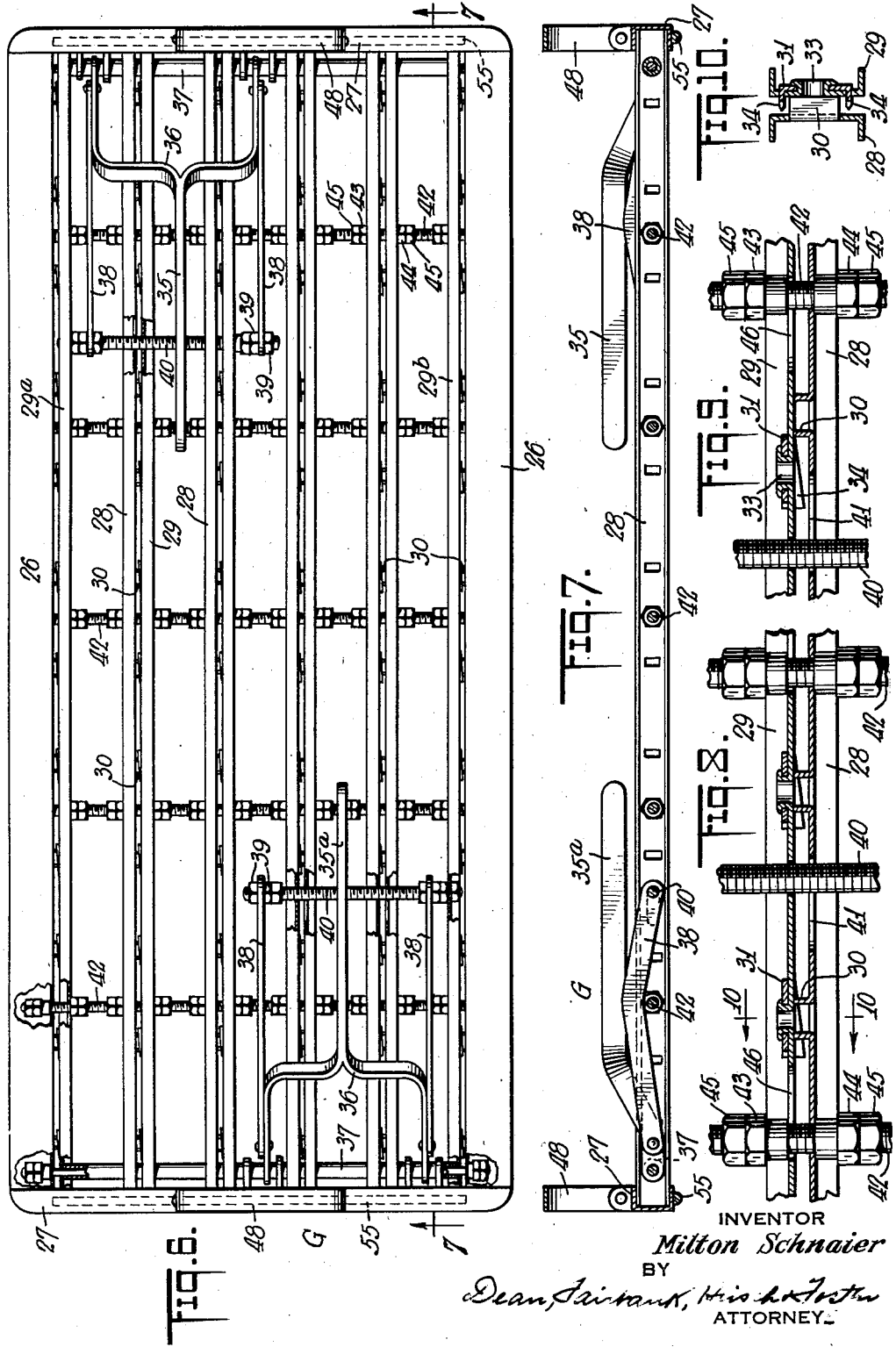

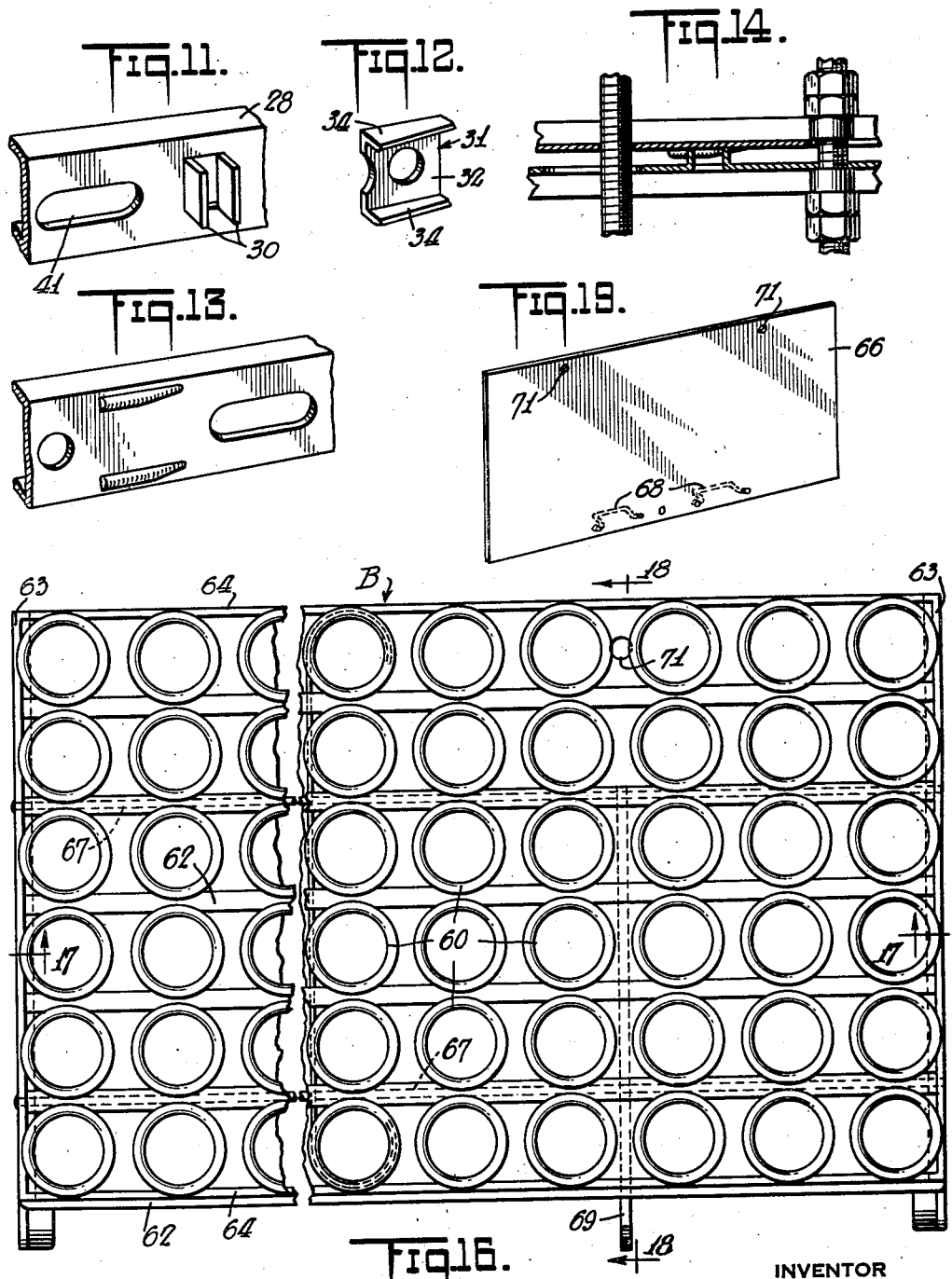

June 4, 1935.  M. SCHNAIER  2,003,516
ART OF MANUFACTURING AND PACKAGING ARTICLES
Filed May 20, 1930  6 Sheets-Sheet 6
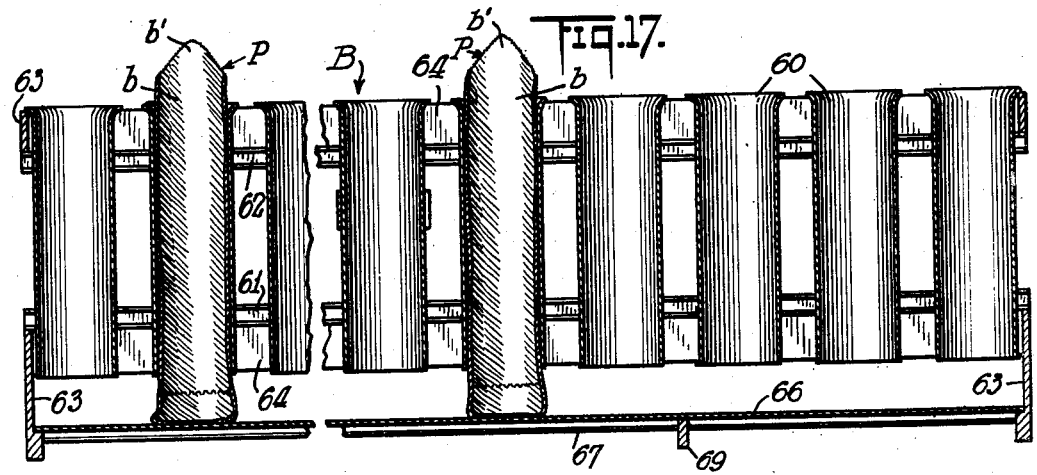
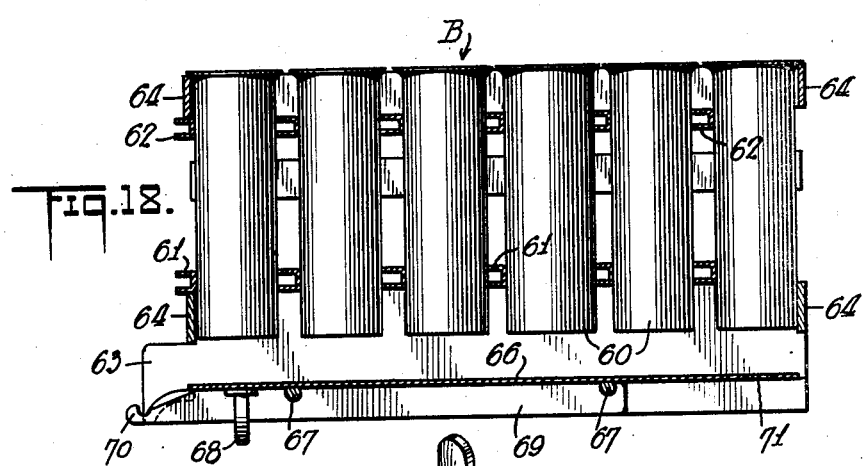
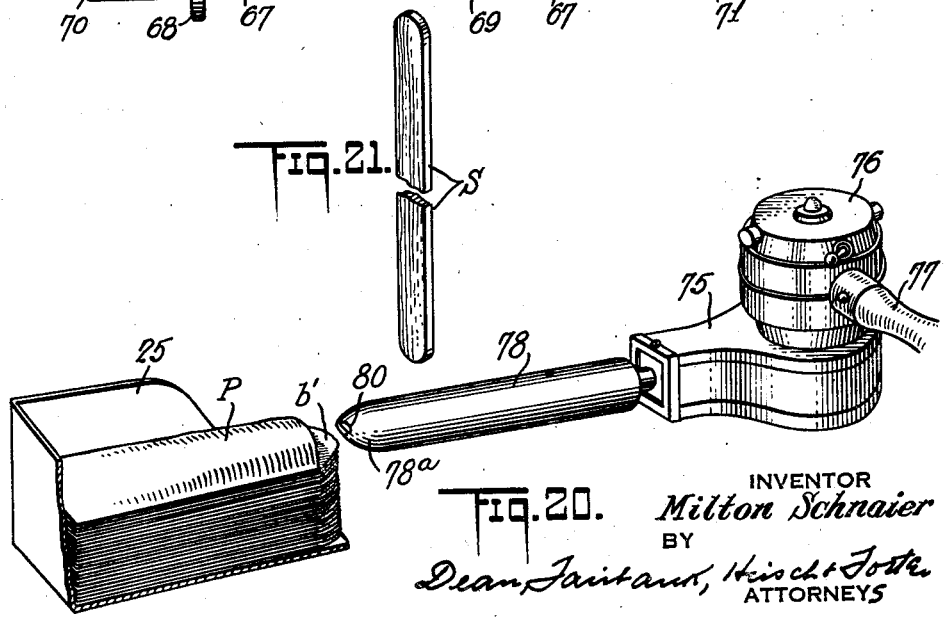
INVENTOR
Milton Schnaier
BY
Dean Fairbank, Hirsch & Foster
ATTORNEYS Patented June 4, 1935

2,003,516

UNITED STATES PATENT OFFICE 2,003,516

ART OF MANUFACTURING AND PACKAGING ARTICLES

Milton Schnaier, New York, N. Y.

Application May 20, 1930, Serial No. 453,896

8 Claims. (Cl. 107—8)

My present invention is primarily concerned with methods of and apparatus for the manufacture and packaging of frozen confections, more particularly confections having handles, although in certain of its broader aspects the invention is also applicable to either the manufacture or packaging, or both, of other articles with or without handles, and molded or otherwise produced.

An object of the invention is to facilitate the manufacture of handled frozen confections made according to the teachings of the patent to Epperson, No. 1,505,592, of August 19, 1924, to reduce the labor cost and to expedite the speed of production, to render the product more attractive and more uniform by assuring the accurate centering of the sticks or other handle members, and finally to render the production more sanitary by eliminating the likelihood of the operatives handling the confections, more particularly during the packaging thereof.

Another object is to provide apparatus for accomplishing the above objects, which apparatus shall be relatively inexpensive, simple, practical, rugged, and durable construction, capable of convenient operation by unskilled operatives, apparatus unlikely to get out of order and substantially devoid of mechanism requiring lubrication, and capable of convenient cleaning to maintain the high sanitary standards desired.

Another more specific object is to facilitate the removal of the frozen confections from their molds without the waste and breakage incurred in dumping the same and without the likelihood of stick or confection breakage incurred in individually pulling them from the molds.

Another object is to open the bags which serve as packages for the confections or other articles and insert the confections therein, without the hand of the operative touching the bag, or the confection.

A feature of the invention is the use of a gripper frame for retaining the various sticks or other handles for the contents of one multi-compartment mold in fixed correctly co-ordinated relation with respect to the mold cavities. The depth to which the sticks enter the mold cavities is pregauged by assembling them in the gripper frame while the latter is rigidly supported at the proper distance above a gauging table, the table serving as a gauging stop for the lower ends of the sticks which are dropped partially through the frame prior to being gripped. Preferably the gripper frame is of contour such as to fit accurately in the top of the mold with the sticks projecting downward into the mold cavities correctly centered with respect to the confection to be frozen, so that upon completion of the freezing the gripper frame may be lifted from the mold, with the confections bonded to the lower ends of the sticks.

Another feature of the invention is the use of the gripper frame in the packaging of the confection. For this purpose, a stand is provided to mount the gripper frame with the confection suspended therefrom, said stand having a bag holder frame below said gripper frame, within which open bags or wrappers are mounted in registry with the corresponding confections held by the gripper frame. The bottoms of the bag holders are open at this time and a large fabric receptacle or hopper is under the frame. Upon release of the sticks or other handles on the gripper frame, the confections drop into the corresponding bags and, carrying the bags with them, continue to fall by gravity through the bag holders and into the hopper below, from which the batch of packaged confections may be removed.

Another feature is the construction of the stick gripper frame. In a preferred embodiment said frame includes stick guides disposed in accordance with the positions of the corresponding mold cavities and retaining the sticks from tilting out of vertical position, and said frame also includes stick gripping members co-ordinated with said guides and preferably operated in multiple by one or more manual operations to grip or release the sticks at will.

Another feature is the method and means for applying the bags or wrappers within the bag holder members of the holder frame. For this purpose it is preferred to provide an electrically operated small blower having a nozzle of approximately the shape of the article to be packaged, but preferably flattened slightly at the nozzle end, which nozzle is positioned upon the protruding flap of the upper paper bag of a pile within a holder box, the light blast blowing the bag open and permitting insertion of the nozzle therein. The friction between bag and nozzle is sufficient to prevent the bag from being blown off the nozzle, and the nozzle with the bag thereover is inserted into the upper end of one of the bag holders. The lower square end of the bag causes the bag to frictionally engage the surrounding hollow holder, this friction coacting with the light blast to overcome the friction between the nozzle and bag and permit withdrawal of the nozzle. The bag remains within the holder tube in open or distended position, ready to receive the corresponding confection or other article. A displaceable closure means, preferably a slide, is arranged below the lower open ends of the bag holders to limit the insertion of the bags into the holders and after the bags are all in place this slide is pulled out so that as the confections are released by the gripper they may fall into the bags and, carrying their bags with them, drop into the hopper below Another feature of the invention is the provision of a frame upon which the bag holder is removably mounted. This frame carries a stacking tray for the unopened bags, slidably mounts the tray below the bag frame, slidably mounts the hopper so that the latter may be pulled out to conveniently discharge its contents, and affords a proper temporary support for the gripper frame after it is removed from the mold with its load of pendent frozen confections.

The invention may be more fully understood from the following description in connection with the accompanying drawings, wherein:—

Fig. 2 is a perspective view of a machine showing the condition of the machine immediately after the wrapper confections have been dropped into the hopper and the slide restored;

Fig. 3 is a perspective view of the frame which supports and guides various elements of the machine;

Fig. 4 is a side elevation showing the stick gripper frame and the means for supporting it above the gauging table;

Fig. 5 is a perspective view of the support device;

Fig. 6 is a plan view of the gripper frame;

Fig. 7 is a longitudinal cross-section taken along the line 7—7 of Fig. 6;

Fig. 8 is a fragmentary view on an enlarged scale and in horizontal cross section through part of the gripper frame showing the operation of the stick gripper mechanism in stick gripping position;

Fig. 9 is a view similar to Fig. 8 showing a view of the parts in stick release;

Fig. 10 is a transverse cross-sectional detail taken on the line 10—10 of Fig. 8;

Fig. 11 is a fragmentary perspective view of the fixed stick guide in the gripper frame;

Fig. 12 is a perspective view of one of the movable stick gripping elements;

Fig. 13 is a fragmentary perspective view of the movable clamping part of a modified form of gripper mechanism;

Fig. 14 is a view similar to Fig. 8 showing the gripping action of the modified type of gripper;

Fig. 15 is a view in transverse cross-section showing the confection mold with the stick gripper in place thereon as during freezing;

Fig. 16 is a plan view of the packaging frame;

Fig. 17 is a longitudinal sectional view of the bag holder frame in position on the main frame and with some of the bags in place;

Fig. 18 is a transverse sectional view of the packaging frame and its associating supporting frame and slide;

Fig. 19 is a perspective view of the slide or tray;

Fig. 20 is a perspective view of the bag opening and embracing tool about to be inserted in the top bag of a stack; and Fig. 21 is a perspective view of one embodiment of handle.

Figure 1:
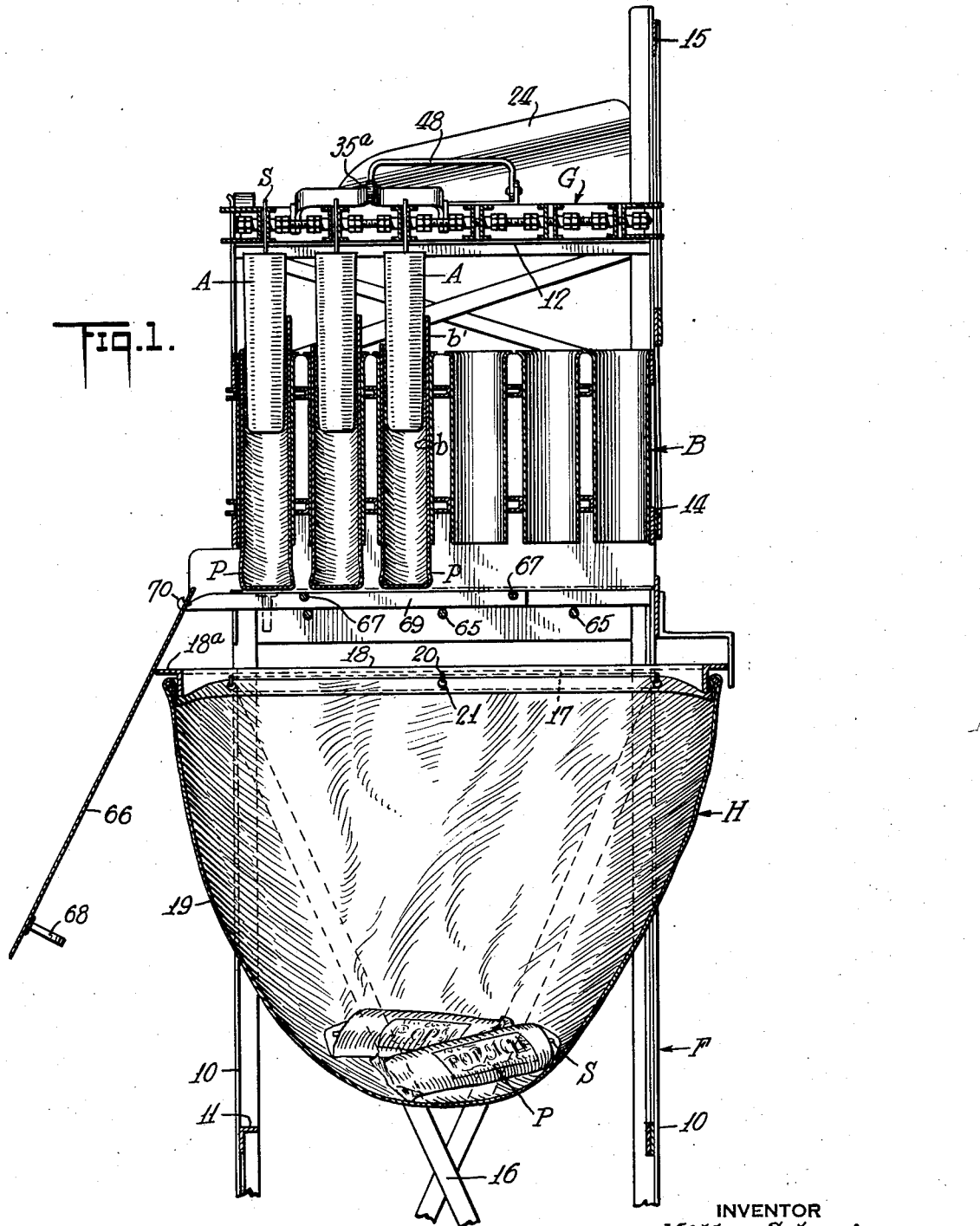
Fig. 1 is a transverse sectional view through the machine illustrating the slide pulled out, some of the confections about to be released into the corresponding bags, and others already released, packaged and in the hopper.

Referring now to the drawings, there is shown in Fig. 3 a unitary stand or main frame F which may be built from channel iron legs 10 connected together by cross pieces such as 11, 12, 13, 14 and 15, and oblique bracing members 16, to build up the unitary, light, inexpensive support for the various frames employed in the release and packaging of the article, such for instance as the handled confection for which the machine has been particularly designed.

The stand affords horizontal support rails 17 for the rectangular frame 18 of the hopper H, the latter preferably comprising a bag 19 hung on the frame 18 and into which the packaged confections drop. The hopper frame affords outstanding flanges 18ª supported on the rails 17 and hooks 20 on the hopper frame engage grommets 21 near the top of the canvas hopper and support the latter.

The stand is also provided with a bagholder frame B, to be described hereinafter, which rests upon parallel horizontal channel rails 23 which are located somewhat above the hopper frame support rails 17.

Above the bagholder frame the members 12 form horizontal rests upon which may be removably supported the gripper frame G gripping the sticks S of the articles A to be packaged, all as will be described below. Flared wear plates 24 guide the gripper frame into position on the rails 12 as the frame is emplaced by hand. Laterally of the frame there is preferably provided a small holder 25 supporting a pile of the packages or bags P to be used in packaging the confections.

The gripper frame G shown in detail in Figs. 6 to 11 preferably includes side pieces 26 and end pieces 27 preferably spot welded together and made of channel bar stock. Longitudinally of the frame piece extend fixed channel bars 28 which coact, each with a corresponding longitudinal shiftable bar 29 contiguous thereto, the two bars by their coaction serving to lock the handles or sticks in correctly spaced relationship to each other and with respect to the similarly spaced mold units with which they are to be brought into coaction, as will be hereinafter more fully set forth.

In a preferred embodiment, as shown more fully in the detail views, Figs. 8 to 12 inclusive, the fixed bars are each provided with corresponding pairs of out-struck tongues 30 (Fig. 11) affording a guide channel for the flat sticks S preferably employed, a perspective view of one of which is illustratively shown in Fig. 21. These out-struck tongues are of length but little greater than the thickness of the sticks.

On the associated slidable bars 29 gripper members 31 are fixedly mounted. In the illustrative embodiment (Fig. 12) each gripper member is a blank having a central web 32 fixed in place by a hollow rivet 33 struck from bar 29, said blank having a pair of horizontal inturned oblique wedge shaped knife edged gripper flanges 34 which straddle the upper and lower edges of the guide tongues 30 when the gripper blades are in locked position (Fig. 8) and are contiguous to said tongues, but laterally thereof when the device is in unlocked position (Fig. 9).

Preferably the side pieces of the gripper frame assembly are each provided with pairs of in-struck stick guiding tongues 30 as shown in Fig. 6 and each has an associated slidable gripper bar shown respectively at 29ª and 29ᵇ of the same construction as bars 28 above described.

In a practical embodiment shown, particularly designed for the manufacture of a frozen confection known as "Popsicle" and commonly frozen in molds of 72 cavities in six rows of 12 each, each cooperating pair of gripper bars 28, 29 and 29ª and 29ᵇ, has 12 sets of equally spaced stick grippers 30, 31 and six sets of gripper bars are provided, as shown, one set at each of the longitudinal frame bars and four equally spaced intervening sets parallel therewith. Thus, 72 sticks would be gripped by the frame in the same relation in which the centers of the mold cavities of a standard mold for this confection would be disposed.

In order to operate the stick gripper frame for locking or releasing the sticks, means is preferably provided for simply sliding the gripper bars 29 and 29ᵃ to displace the grippers 31 to the respective positions indicated in Figs. 8 and 9. For convenient operation, the slidable gripper bars operate as two separate sets of three bars each, one set being shifted toward the left in Fig. 6 for locking by the operation of a swinging handle 35, and the other set being shifted to the right for locking the sticks by operation of the swinging handle 35ᵃ at the opposite end of the gripper frame. By simultaneously grasping the handles and swinging them toward or away from the gripper frame, both sets of movable gripper bars may be simultaneously operated. Each handle is preferably made of strip metal and has a yoke end 36 keyed to a transverse support rod 37 at one end of the frame. The yokes of the handle carrier pitman rods 38 are affixed by means of nuts 39 at their outer ends to a threaded rod 40 and extend transversely through three sets of gripper bars. The fixed bars 26 and 28 have elongated slots 41 therein to accommodate free movement of the rod 40.

The channelled gripping bars, both the stationary and slidable ones, are preferably of relatively thin stock and easily bendable in transverse direction. To steady these bars, transverse threaded ties or rods 42 are affixed at their ends in the longitudinal frame pieces 26 of the gripper assembly and companion nuts 43 and 44 with associated lock nuts 45 determine the spacing between each flexible stationary bar and its associated slidable bar, as shown. These nuts are adjustable to compensate for wear, so as to dispose the stick gripping members 31 in correct operative relation at all times with respect to the stick guiding tongues 30. Slots 46ᵃ are provided in the movable bars 29 so that the rods 42 do not block their movement.

The transverse bracing rods for the gripper bars are illustratively five in number, so that only two stick gripping conformations are disposed between two adjacent brace rods, thereby assuring the correct relation of the coacting stick guides and stick gripping conformations. The pitmans 38 are of V form as shown in Fig. 7, to clear the corresponding tie rod 42.

The manner of use of the stick gripper frame will now be set forth.

Referring to Figs. 4 and 5, the template fixture T is simply an open rectangular frame supported on legs 46 and adapted to rest upon a gauging table G'. The frame has spaced longitudinal channel bars 47 to snugly accommodate the lateral edges of the gripper frame. The gripper frame is laid upon the template piece, with the handles 35, 35ᵃ in elevated position in which the stick grippers 31 are retracted from the corresponding guides 30.

The sticks S are then dropped in the guides 30 and descend by gravity until their lower ends contact the gauging table G or other support platform. Thereupon, the operating handles 35 and 35ᵃ are grasped and swung downwardly against the gripper frame (Fig. 7). In this action, as is apparent from the foregoing description, the stick grippers 31 are shifted longitudinally, entering into wedging relation with respect to the corresponding sticks or handles, firmly to grip the latter. It will be noted that the stick guiding tongues 30 maintain the sticks against displacement from vertical relation, so that the entry of the wedging gripping piece will not tilt the sticks.

The gripper frame is lifted by its carrier handles 48 at the ends thereof and with the secured handle sticks depending therefrom is transported to the mold M, as appears best in Fig. 15. This mold illustratively comprises a multiplicity of generally tapering cylindrical elongated molding cavities 49 the lower ends of which are secured together by appropriate transverse longitudinal bracing bars 50 and the rims of which are firmly crimped at 54 with respect to a filling pan 51 having upstanding flanges 52. The ends of bracing bars 50 are mounted on runners 53. The particular gripping frame specifically described is intended for a mold of the construction set forth, having 72 cavities in six parallel rows of 12 each. The gripper frame is of the same dimensions as the bottom of the mold, so that upon simply placing the gripper frame upon the mold, as shown, the lower ends of the sticks gripped thereto will automatically enter into the corresponding molds and substantially axially thereof. Where the molds are formed with corrugation (not shown) at the junction of one side flange and pan short spacer rods 55 fixed to the gripper frame below the ends thereof will prevent canting of the gripper frames when they are placed in the pans.

The molds having been charged with syrup or other mix 56 to be frozen or otherwise molded in manner not specifically material to the invention herein claimed, the mix is solidified in the present embodiment by freezing it in a brine tank (not shown), each mold carrying with it into the tank the corresponding gripper frame resting on top thereof.

After the refrigeration is completed, the frozen bond between the confections and the mold walls is broken, as by dipping the entire mold in luke warm water. Thereupon the gripper frame is grasped by its lifting handles 48 and raised from the mold. In this operation the sticks and the confections bonded thereto are bodily withdrawn from the mold. All of the confections being thus simultaneously raised, each helps guide the others out of the molds and there is no twisting strain upon the sticks or confections to cause breakage of one or the other. The prior practice of inverting a mold to dump the confections is thus done away with.

The gripper frame carrying the frozen confections by their handles is now transported to the release and wrapping stand, best shown in Fig. 2, for release of the confections and automatic wrapping thereof, in manner to be described below.

The packaging frame B in the preferred embodiment comprises a battery of vertical open metal tubes 60 arranged in the present instance in 12 rows of six each. These tubes are preferably soldered or otherwise firmly attached with respect to longitudinal and transverse carrying rods 61, 62. Each of these rods is preferably built of channel bar stock to afford a firm and rigid assembly. The ends of rods 61 rest upon and are secured to upstanding transverse end plates 63 of a carrying frame, these plates being connected together by longitudinal bars 64. The transverse members 63 rest upon the rails 23 of the frame F and thereby support the lower ends of the packaging tubes in spaced relation above the longitudinal cross rods 65 of frame F.

The support for the packaging frame also carries a releasing slide 66 shown in detail in Fig. 19 and normally supported as shown in Fig. 18 upon a pair of transverse rods 67 carried by the packaging support and provided with a pair of depending handles 68 by which it may be drawn forward. For this purpose, bars 67 of the support frame carry a pair of transverse rails 69 each with a hook 70 protruding from the forward edge thereof and in the path of movement of corresponding apertures 71 near the rear edge of the slide 66. Accordingly, when the slide is moved forward, the apertures 71 engage hooks 70 and the slide or pan 66 hangs in the position shown in Fig. 1.

The packaging frame tubes serve to mount the bags P or other wrappers in which the articles are to be packaged, these bags being disposed in open relation in the said tubes. For convenience in charging the packaging frame with the bags, it is preferred to employ the special bag opening or emplacing tool shown in Fig. 20. This tool comprises simply an ordinary blower 75, such as is used in hairdressing establishments for instance, with an electric motor 76 having a handle 77. Attached to the blower is a special nozzle 78 preferably approximately of the shape and size of the article to be packaged. This nozzle has a longitudinal bore therein (not shown) through which the light blast of air from the blower escapes by way of the nozzle opening 80. Preferably the end of the nozzle piece is flattened somewhat as at 78ª for facility of admission thereof into the closed bags. The bags are of conventional square ended construction, in which one side b has a tab b' protruding beyond the other.

For charging the packaging frame with the bags, the tool of Fig. 20 is set into operation, the nozzle end is rested upon the protruding flap b' of the uppermost bag in the pile stacked in holder 25, whereby the ejected air will blow the bag open and afford ready entry for the nozzle as the same is pushed forward. The bag stays in place upon the nozzle piece (friction between bag and nozzle overcoming the light blast) and is simply transported to the packaging frame and the handle piece inserted thereinto through the upper end thereof until it is limited by the release slide piece 66 at the lower end thereof, whereupon the nozzle piece is withdrawn from the filler tube. In this operation the bag remains in open distended position within its filler tube 60. The bag being of usual construction with an inturned flap at its lower or closed end, the said flap forms an obstruction affording sufficient friction (and aided by the blast) to overcome the friction between bag and nozzle and thus prevent withdrawal. In the continued blowing of the air from the nozzle during removal of the latter from the filling frame, the bag is caused more clearly to hug the inner wall of the packaging tube in accordance with requirements. Having served its purpose of limiting the insertion of the bags, slide 66 is now withdrawn to the position of Fig. 1.

Now the gripper frame, with its sticks held therein and the frozen confections firmly bonded to the lower ends thereof, is transported as previously suggested to rest upon the release and packaging stand rails 12 supporting the frame and wings 24 guiding it into position on the rails.

The packaging frame having been charged with bags in the manner previously described, the mere positioning of the gripper frame in place as shown in Fig. 2 causes the lower ends of the confections to enter automatically into the upper ends of the bags within the packaging frame tubes. The release handles of the gripper frame are now simply raised to the position shown in Fig. 2, thereby releasing the various confections and causing the same to drop by gravity into the abutments of the respective bags.

The slide 66 of the packaging being out of the way, the packaged confection continues to fall by gravity into the hopper H therebelow. By reason of the moistness or adhesiveness of the confection, there is no possibility of the bags loosening with respect thereto in the descent to the hopper bag.

The hopper is now slid out to the position of Fig. 2. The individual confections are removed from the hopper bag. The upper ends of the wrapper bags are twisted to complete the packaging during the process of packing the confections in the two dozen boxes or other containers therefor.

In order to avoid multiplicity of figures, the showing of Fig. 1 indicates one set of three rows of the packaging frames already discharged into the hopper and the other set controlled by the handle still gripped by the gripper frame. In practice, however, the device would be used as previously described, both handles being elevated concurrently to cause all of the confections to drop simultaneously into the hopper bag.

It will be understood that while the invention has been illustratively shown as applied in the manufacture of a frozen confection of one particular form, made in one particular design of mold, it will be clear that the principle of the invention is applicable to the manufacture of confections and other articles of various shapes and in larger or smaller multiple molds having any number of cavities arranged to suit the requirements of economical manufacture.

While in the specific embodiment disclosed, the sticks or other handles have been illustrated as inserted by hand into the gripper frame, it will, of course, be apparent that automatic machinery or other means, preferably in the form of a jiggling hopper, could be applied for automatically guiding the sticks into the gripper frame.

It is also to be understood that while the bag distending and positioning tool of Fig. 20 has been shown with but a single nozzle, it is within the scope of the invention to form such tool with a multiplicity of parallel nozzles so that by a single operation a plurality, say a dozen, of the bags could be simultaneously distended and thereupon inserted in the corresponding tubes of the packing frame.

It is also to be understood that where the sticks or handles are to extend the entire length of the mold, as for instance disclosed in the prior patent to Epperson, the mold itself could be employed as the stick positioning template instead of the frame shown in Figs. 4 and 5. In that case, the gripper frame of Figs. 5 and 6 would be mounted directly on the mold prior to insertion of the sticks therein.

It is, of course, to be understood that the arrangement of stick gripping and stick releasing handles is largely illustrative and, if desired, all of the sticks of the molds could be controlled from a single handle instead of from two handles, and it is within the scope of the invention to cause the stick gripping means automatically to be tripped, if desired, upon deposit of the frame on the release and packaging stand shown in Figs. 1, 2 and 3.

With the present construction the stick gripper frame in addition to its various other functions, serves to predetermine the extent of immersion of the sticks, to center them in the molds and to prevent them from floating upwardly during freezing of the confections, whereby to aid in the desired uniformity of product.

It will thus be seen that there is herein described apparatus and an article obtained thereby in which the several features of this invention are embodied, and which apparatus in its action attains the various objects of the invention and is well suited to meet the requirements of practical use.

Many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention what I claim as new and desire to secure by Letters Patent is:—

1. The method of manufacturing and packaging molded handled articles, which consists in aligning a multiplicity of handle members in parallel relation, locking said handles in fixed position relative to each other, co-ordinating said locked handles with respect to corresponding relatively fixed mold cavities, completing the molding operation, removing the relatively fixed handles with the molded product bonded thereto from said molding cavities and disposing said gripped handles with the molded bodies in downwardly extending relation and in alignment with respect to a corresponding multiplicity of open wrappers and thereupon releasing said handled bodies to drop with their molded ends into said open wrappers.

2. The method of manufacturing and packaging molded handled articles, which consists in aligning a multiplicity of handled members in parallel relation, locking said handles in fixed position relative to each other, co-ordinating said locked handles with respect to corresponding relatively fixed mold cavities, completing the molding operation, removing the relatively fixed handles with the molded product bonded thereto from said molding cavities and disposing said gripped handles with the molded bodies in downwardly extending relation and in alignment with respect to a corresponding multiplicity of laterally supported open wrappers, then releasing the handles whereby the various wrappers are freed by the weight of their contained molded articles.

3. The method of manufacturing handled frozen confections which consists in locking a multiplicity of handle sticks in fixed parallel relation, inserting the lower ends of said handles in a single operation into correspondingly co-ordinated molding cavities, freezing confection material within said cavities for bonding about said sticks, releasing said frozen confections from said molding cavities, removing said relatively fixed handle sticks with their molded confections from said molding cavities, positioning a multiplicity of open bags in co-ordinated relation with respect to said confections, releasing said handle members to permit said confections to enter said wrappers.

4. Apparatus of the character described, including an open frame, a plurality of parallel relatively fixed bars, extending along said frame, a plurality of stick guides transversely of the said respective bars, to retain the sticks from tilting out of vertical position, displaceable bars closely associated with the respective fixed bars, each of said displaceable bars having a stick gripping member adjacent the corresponding stick guide of the associated fixed bar, struts extending transversely of the respective fixed and displaceable bars, adjacent corresponding stick guides to retain said bars from distortion and adjustment means to determine the spacing between each fixed and corresponding displaceable bar for proper co-ordination between each stick guide and the corresponding stick gripping means.

5. In apparatus of the character described, an open frame, a plurality of longitudinal sheet metal channel bars fixed with respect thereto, each of said bars having struck-up stick guides for maintaining corresponding sticks from tilting out of vertical position, longitudinally slidable bars in close parallelism with respect to the corresponding fixed bars, each of said slidable bars having stick gripping members rigid with respect thereto and closely associated with respect to said stick guides for gripping or releasing the sticks, depending on the position of the said bars, and means for operating said bars in accordance with requirements.

6. Apparatus of the character described, comprising an open frame having a plurality of fixed longitudinal guide bars, each of said bars having out-struck tangs determining guides for retaining sticks from tilting out of vertical position, stick gripper bars closely associated with said stick guide bars, said gripper bar having gripping elements associated with the corresponding guide elements and means for displacing said gripper bars to relatively small range in accordance with requirements to bring the gripping elements into or out of operative relation with respect to said stick guide means.

7. Apparatus of the character described comprising an open frame, longitudinally fixed stick guide members, each of said guide members having out-struck tongues forming guide tacks to retain the corresponding stick from tilting displacement, stick gripping bars in close association and parallel relation with respect to said guide bars, each of said gripping members having a gripping blade structure riveted thereto with out-turned oblique cutting edges adapted to straddle across the ends of the out-struck tongues of the stick guide means, and means for longitudinally displacing the stick gripping members at will to cause the blades to engage or disengage the correspondingly positioned sticks.

8. In apparatus of the character described, an open frame, longitudinal fixed stick guiding bars within said frame, longitudinal stick gripping bars closely associated with the corresponding stick guide bars, said latter bars being of relatively flexible metal, transverse strut members having nuts adjacent the said guide members for displacing the same into correct correlation with the fixed guide members, said gripping bars having gripping structures rigid therewith and manual means for shifting said gripping bars for holding or releasing correctly positioned sticks.

MILTON SCHNAIER.